Nov. 1, 1966  E. L. ZEHRBACH  3,282,073
LAUNDRY APPARATUS
Filed Dec. 12, 1963
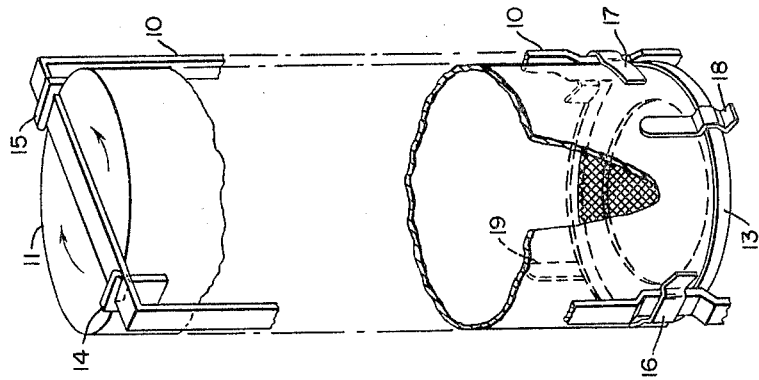
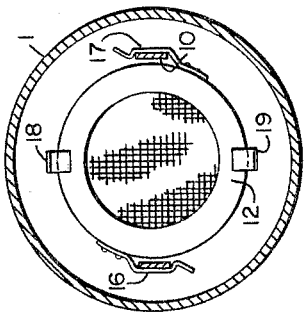
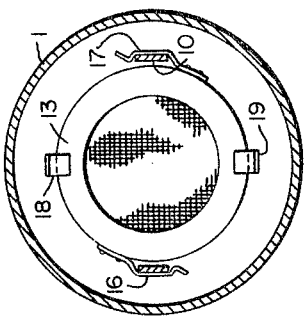
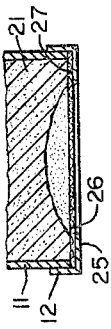
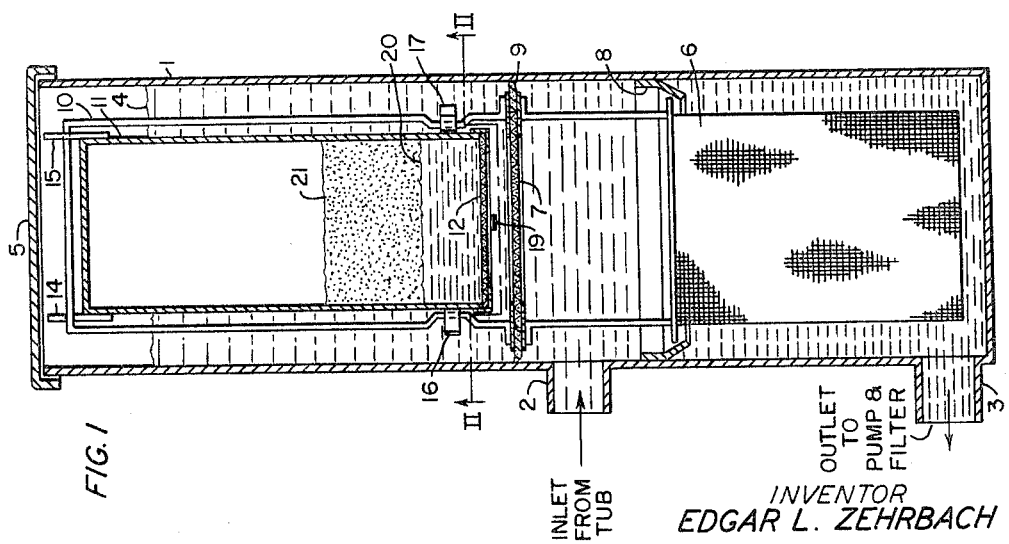
INVENTOR
EDGAR L. ZEHRBACH
ATTORNEY з,282,073
LAUNDRY APPARATUS
Edgar L. Zehrbach, Mansfield, Ohio, assignor to Westinghouse Electric Corporation, Pittsburgh, Pa., a corporation of Pennsylvania
Filed Dec. 12, 1963, Ser. No. 330,149
5 Claims. (Cl. 68—18)

This invention relates to dry cleaning apparatus and particularly to dispensing means incorporated therein to feed automatically the proper amount of filter aid material added to the solvent fluid used.

It is conventional in the dry cleaning art to use a filter aid powder, such as diatomaceous earth to counteract the growing amount of grease, coloring matter and soils accumulated by the dry cleaning fluid. Generally this powder accumulates as cake on the surface of the filter through which the dry cleaning fluid is passed at the end of each operation and before the next such operation. This cake performs the double duty of mechanically cleaning the fluid as a fine mesh filter and chemically disposing of the dissolved matter which might otherwise tint the fabric being cleaned or leave an objectionable odor. The formation and maintenance of this cake is an important factor in the economical operation of the dry cleaning apparatus both from the standpoint of the speed of operation and the number of cycles of operation which may be performed before renewal of the fluid and the cleaning out of the filter cake is necessary. Hence it is important that the filter cake be formed slowly as needed and not too rapidly as when the diatomaceous earth is scooped into the apparatus often in batches larger than necessary by an operator lacking experience and judgment.

When the filter is in use, the dirt is collected on the surface of the filter cake in a thick coat. Since the dirt consists of all different sizes of microscopic particles, human and other miscellaneous oils, gelatin and so forth, a slime coat is created which is resistant to the flow of the cleaning fluid. However, if a small amount of diatomite is included with the dirt the slime coat is broken up into a porous layer, rendering it possible to run a larger number of loads before the filter cake must be reconstituted.

It is common practice to charge a clean filter with a filter aid consisting of diatomaceous earth, activated charcoal and a special soap. When the pump forces the fluid into the filter it is directed toward the bottom where it washes the filter aid up and deposits it in the form of a cake on the fine mesh screen filter tube. This cake is very porous at first, but becomes less porous as time passes. When the fluid flow is reduced, due to the dirt accumulation, to the point where poor cleaning may result, the pump is stopped and the cake knocked off the filter tubes, after which the cake is reconstituted and again becomes very porous.

In the operation of the dry cleaning apparatus, the charging tank is empty at the beginning of a cycle. The tub is then filled with fluid after which the fluid is circulated from the tub to the charging tank, the pump, the filter and back to the tub. When the cleaning fluid comes from the fabrics in the tub it must first fill the charging tank before any is admitted to the filter. When the charging tank is full, diatomite is washed out of the dispenser in the charging tank and goes through the filter with the dirt. At all other times the machine is in standby with the fluid circulating through the storage tank and the filter only, this being required to hold the cake on the tubes in readiness to clean at any time. Experience has shown that the filter does not "blind" unless dirt is introduced, wherefore it is unnecessary to dispense diatomite when the flow into the filter is not carrying more dirt.

An object of the invention is to provide means for dispensing diatomite at a rate as nearly as possible equal to the rate at which it may be usefully employed and particularly at the times that it may be so needed.

Another feature of the invention is to provide means for dispensing diatomite not throughout the use of the dry cleaning apparatus but only during a given portion of the complete cycle of operations thereof.

In accordance with this invention a container is placed in the line of flow of the dry cleaning fluid employed in such a manner that during a given portion of the cycle of operation the liquid therein will rise to near the top thereof. A can charged with fresh diatomite, liquid tight except for the bottom end thereof, which is closed by a screen of selected dimensions, is hung in this container so that the dry cleaning liquid will enter the bottom zone of the diatomite but will rise only a short distance upwardly due to the air trapped therein. Due to the rise of the level of the fluid in this can and the recession thereof a small amount of diatomite is mixed into the fluid and carried away thereby and thus a definite and limited amount is added to the liquid during each recurring cycle of operation.

A feature of the invention is the use of selected screens used as the bottom closure of the said dependent can so that by experience and judgment the operator may change the said screen to increase the amount of diatomite dispensed when the load of fabrics is changed as from white materials to dark colored materials. The screen may be mounted as a screw top cover so that as the can is charged one or another of such screens may be selected and used.

Another feature of the invention is the manner in which the diatomite is placed for dispensing, that is, it is dispensed downwardly from the bottom of the can so that by gravity a sufficient amount will always be at hand as the cleaning fluid rises in level in the dependent can and then retreats downwardly.

Another feature is the structure including a handle from which the dispensing can depends which may be lifted bodily from the container. This structure includes a button trap covered by a mesh and may be replaced by a spare structure having a fresh can of diatomite so that no time is lost in charging the device in the interval in the cycle of operations when the level of the cleaning fluid is low.

Another feature of the invention is the use of an open bottom dependent can of filter aid submerged in turbulent fluid, the filter aid being retained by a screen cap so that the rate at which the filter aid is allowed to fall into the stream of cleaning fluid depends on the mesh of the screen as well as the turbulence of the fluid. It will be known that the fluid flows through the container, in from the tub and out to the pump and thence to the filter during the cleaning operation, but not during other operations, as when the tub is being filled or emptied of fabrics or when it is being loaded with the solvent fluid.

The drawings consist of one sheet having five figures, as follows:

FIGURE 1 is a vertical section, schematic in nature, of the container holding therein a dependent can of filter aid;

FIG. 2 is a horizontal section taken on line 2—2 of FIG. 1 showing mainly the screen cap placed on the bottom open end of the can of filter aid;

FIG. 3 is a view similar to FIG. 2 showing a finer meshed screen cap for the can of filter aid and indicating that control of the rate at which filter aid is dispensed into the stream of cleaning fluid may be had by the use of a variety of such caps.

FIG. 4 is a perspective view of the can of filter aid showing how it may be adjusted to depend from the handle of the apparatus inserted in the container of FIG. 1, and FIG. 5 is a fragmentary detailed view of the lower end of the can.

In FIG. 1, the numeral 1 is used to designate the container used in a dry cleaning machine which is placed in line between the tub where the cleaning operation is carried out and the pump used to circulate the solvent. The inlet from the tub is marked with the numeral 2 and the outlet to the pump and thence to the filter is designated 3. When a cleaning operation is taking place, the fluid will rise in this container to about the level 4, but at other times the container 1 is emptied of fluid.

The container 1 is covered by a top cap 5 which may be removed to grasp the dispenser apparatus within the container. This apparatus consists of a button trap 6 hung from a filter screen 7 and resting on a flange 8 affixed to the body of the container 1. The screen 7 is edged with a felt ring 9 so it will be noted that buttons or any other objects brought into this container through the inlet 2 will be trapped, allowing only clear fluid, with some finely divided filter aid, to flow from the outlet 3 to the pump and thence to the filter.

Secured to the top of the filter screen 7 is a handle 10 by which the apparatus within the container 1 may be removed. The dispenser of the present invention is a can 11, air tight except for its open bottom end to which the screen cap 12 or 13 may be attached.

The can is provided with a pair of ears 14 and 15 which, by a clockwise twist of the can 11, may be made to engage the handle 10 to depend therefrom during the operation of the cleaner. Near the open end bottom of the can 11 there are affixed thereto a pair of spring clips 16 and 17 which operate to lock the can 11 in position when it has been twisted clockwise as far as possible, but which will give way when the can is given a counterclockwise twist for removal.

Also affixed to the can 11 is another pair of spring clips 18 and 19, best shown in FIG. 4, by which the screen cap 12 or 13 may be secured to the can.

In operation, the apparatus consisting of the button trap 6, the screen 7, the handle 10 and the dependent can or dispenser 11 is removed from the container 1, the can 1 is detached from the handle 10 and then loaded with filter aid. When this has been replaced and a screen cap 12 or 13 has been clipped to the can 11, the dispenser is ready for replacement in the container. The choice of one or another cap 12 or 13 is a matter of judgment arising from experience. When the apparatus is replaced in the container 1 and the machine is placed in operation the cleaning fluid may rise to the level 4 in the container, but will rise only to the level 20 within the can 11 due to air trapped therein. Due to the rise in level of the cleaning fluid within the can 11 and due partly to the turbulence of the fluid as it flows through the container 1, a certain amount of filter aid 21 will be passed downwardly through the screen cap 12 and the screen filter 7 into the stream of cleaning fluid.

The screen caps 12 and 13 each include an imperforate annular rim portion 25 (FIG. 5) defining a central opening 26 which is covered by the screen. The opening 26 is of sufficiently smaller diameter than the interior of the can 11 to provide an annular upwardly facing shoulder or ledge 27 which aids in supporting the diatomite and limiting the quantity thereof discharged at any one time.

Thus it will be noted that filter aid is dispensed in amounts determined by experience and only while the cleaning operation is being carried out.

What is claimed is:

1. In a dry cleaning device wherein fabrics are subjected to the action of fluid solvents to extract therefrom soils of various kinds, in which said fluid solvent gradually accumulates a load of soils and in which a filter aid is used for cleaning said fluid solvent for reuse, means for dispensing filter aid consisting of a vertically disposed container piped into said device so that fluid solvent may be periodically pumped thereinto while said fabrics are being subjected thereto, a removable device consisting of a screen and a button trap and a handle for removing said removable device from said container, said handle being shaped to act as a support for and suspending an open ended can of filter aid in said container, mesh screen closure means for selectively and partially closing said open end of said can, hook means attached to said can for suspending said can on said handle, said hook means being disposed so that said open end of said can comprises the bottom thereof whereby fluid rising in said container will rise into said can a distance limited by air trapped therein and whereby a limited amount of filter aid is washed out and added to said fluid.

2. In a dry cleaning device wherein fabrics are subjected to the action of fluid solvents to extract therefrom soils of various kinds, in which said fluid solvent gradually accumulates a load of soils and in which a filter aid is used for cleaning said fluid solvent for reuse, means for dispensing filter aid consisting of a vertically disposed container piped into said device so that fluid solvent may be periodically pumped thereinto while said fabrics are being subjected thereto, said container being so disposed vertically whereby the top level of said fluid will be controlled by the normal operation of said device, a removable device consisting of a screen and a button trap and a handle for removing said removable device from said container, said handle being shaped to act as a support for and suspending an open ended can of filter aid in said container, mesh screen closure means for selectively and partially closing said open end of said can, hook means attached to said can for suspending said can on said handle, said hook means being disposed so that said open end of said can comprises the bottom thereof whereby fluid rising in said container will rise into said can a distance limited by air trapped therein and whereby a limited amount of filter aid is washed out and added to said fluid, said limited amount of filter aid is washed out and added to said fluid, said limited amount of filter aid is being controlled by the particular mesh size of said screen closure means.

3. In a dry cleaning device wherein fabrics are subjected to the action of fluid solvents to extract therefrom soils of various kinds, in which said fluid solvent gradually accumulates a load of soils and in which a filter aid is used for cleaning said fluid solvent for reuse, means for dispensing filter aid consisting of a container piped into said device as a part thereof, said container being disposed in said device in such position that periodically as part of the cycle of operation thereof said fluid solvent will rise to near the top thereof, removable means placed in said container consisting of a plurality of screens, a button trap, a handle and a bottom open ended can suspended from said handle, said open end of said can being partially closed by one of said screens and said can being filled with a filter aid, said can being placed in said container so that a rising level of solvent will produce a limited rising level of solvent within said can whereby said rising level followed by a recession thereof will wash a limited amount of said filter aid into said fluid for the cleansing thereof.

4. In a dry cleaning device wherein fabrics are subjected to the action of fluid solvents to extract therefrom soils of various kinds, in which said fluid solvent graually accumulates a load of soils and in which a filter aid is used for cleaning said fluid solvent for reuse, a filter aid dispenser incorporated in said device as a part thereof, said dispenser consisting of a container having an inlet and an outlet pipe for substantially filling said container with fluid solvent and then for withdrawing said solvent, said container having a removable apparatus consisting of a button trap, a handle for removing said apparatus and a can filled with filter aid depending from said handle, said can having an open bottom end but being otherwise air tight, screen means for covering said bottom end of said can, said screen means being of a size and mesh to allow a predetermined amount of filter aid to wash out of said can and into said fluid solvent on each rise and fall in the level of said solvent, whereby during said withdrawal of said solvent a predetermined amount of said filter aid is added to said solvent.

5. In a dry cleaning device wherein fabrics are subjected to the action of fluid solvents to extract therefrom soils of various kinds, in which said fluid solvent gradually accumulates a load of soils and in which a filter aid is used for cleaning said fluid solvent for reuse, a filter aid dispenser incorporated in said device as a part thereof, said dispenser consisting of a container having an inlet and an outlet pipe for substantially filling said container with fluid solvent during a dry cleaning operation, said solvent flowing therethrough constantly with sufficient head to maintain a level to substantially fill said container, said container having a removable apparatus consisting of a button trap, a handle for removing said apparatus and a can filled with filter aid depending from said handle, said can having an open bottom end but being otherwise air tight, screen means for covering said bottom end of said can, said screen means being of a size and mesh to allow a predetermined amount of filter aid to wash out of said can into said fluid solvent as said solvent flows through said container, said solvent in flowing through said container being sufficiently turbulent to cause filter aid to drop out of said dependent can at a rate determined by the mesh of the said screen covering said bottom end of said can and the degree of turbulence of said solvent.

References Cited by the Examiner

UNITED STATES PATENTS

| | | | |
|---|---|---|---|
| 1,556,913 | 10/1925 | Capra | 210—470 X |
| 1,981,645 | 11/1934 | Gans | 210—75 X |
| 2,332,030 | 10/1943 | Toronto | 222—193 X |
| 3,050,192 | 8/1962 | Beutler | 210—75 X |

FOREIGN PATENTS

| | | |
|---|---|---|
| 645,384 | 11/1950 | Great Britain. |
| 98,295 | 7/1961 | Norway. |

REUBEN FRIEDMAN, *Primary Examiner.*

J. DE CESARE, *Assistant Examiner.*